United States Patent
Salanne et al.

(10) Patent No.: US 11,338,928 B2
(45) Date of Patent: May 24, 2022

(54) ON-BOARD POWER SUPPLY NETWORK OF AN ELECTRICALLY PROPELLED AIRCRAFT

(71) Applicant: SAFRAN, Paris (FR)

(72) Inventors: Jean-Philippe Hervé Salanne; Stephane Petibon, Moissy-Cramayel (FR); Florent Rougier, Moissy-Cramayel (FR); René Meunier, Moissy-Cramayel (FR); Meriem Abdellatif, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/283,868

(22) PCT Filed: Oct. 4, 2019

(86) PCT No.: PCT/FR2019/052360
§ 371 (c)(1),
(2) Date: Apr. 8, 2021

(87) PCT Pub. No.: WO2020/074812
PCT Pub. Date: Apr. 16, 2020

(65) Prior Publication Data
US 2021/0347492 A1    Nov. 11, 2021

(30) Foreign Application Priority Data

Oct. 9, 2018 (FR) ...................... 18 59351

(51) Int. Cl.
*B64D 27/24* (2006.01)
*B64D 41/00* (2006.01)
(Continued)

(52) U.S. Cl.
CPC ............. *B64D 27/24* (2013.01); *B64D 41/00* (2013.01); *H02J 4/00* (2013.01);
(Continued)

(58) Field of Classification Search
None
See application file for complete search history.

(56) References Cited

U.S. PATENT DOCUMENTS 10,017,266 B2   7/2018 Phan et al.
2009/0302153 A1  12/2009 Matasso et al.
(Continued)

FOREIGN PATENT DOCUMENTS

EP          3 372 506 A1    9/2018
WO    WO 2017/137537 A1    8/2017
WO    WO 2018/122297 A1    7/2018

OTHER PUBLICATIONS

International Search Report dated Jan. 24, 2020 in PCT/FR2019/052360 filed on Oct. 4, 2019, 3 pages.
(Continued)

*Primary Examiner* — Jared Fureman
*Assistant Examiner* — Aqeel H Bukhari
(74) *Attorney, Agent, or Firm* — Oblon, McClelland, Maier & Neustadt, L.L.P.

(57) ABSTRACT

A system for supplying electrical energy to at least one electrical load of an aircraft, this system including a main source of electrical energy connected to at least one electrical load through an electrical network, the system including a control device connected to the main source of electrical energy and configured to deliver a variable voltage level on the electrical network based on a predetermined voltage variation law depending on at least one parameter characterizing the altitude of the aircraft and according to the Paschen law with a predefined margin.

8 Claims, 3 Drawing Sheets

(51) Int. Cl.
*H02J 4/00* (2006.01)
*B64D 27/02* (2006.01)

(52) U.S. Cl.
CPC .. *B64D 2027/026* (2013.01); *B64D 2041/002* (2013.01); *B64D 2221/00* (2013.01); *H02J 2310/44* (2020.01)

(56) References Cited

U.S. PATENT DOCUMENTS

| | | |
|---|---|---|
| 2015/0285165 A1 | 10/2015 | Steinwandel et al. |
| 2018/0233923 A1* | 8/2018 | Compton .................. H02J 4/00 |
| 2018/0251228 A1 | 9/2018 | Sands et al. |
| 2018/0029771 A1 | 10/2018 | Phan et al. |
| 2018/0283292 A1 | 10/2018 | Steinwandel et al. |
| 2019/0152617 A1 | 5/2019 | Anton et al. |
| 2019/0225348 A1* | 7/2019 | Salanne .................. H02J 4/00 |

OTHER PUBLICATIONS

French Preliminary Search Report dated Jun. 7, 2019 in French Application No. 18 59351 filed on Oct. 9, 2018 (with translation of category of cited documents), 3 pages.

\* cited by examiner

ON-BOARD POWER SUPPLY NETWORK OF AN ELECTRICALLY PROPELLED AIRCRAFT

BACKGROUND OF THE INVENTION

The present invention relates to the field of high-voltage propulsion architectures and more particularly to an on-board power supply network of an aircraft. The electrical propulsive power is caused to increase with the internal hybridization of aircraft engines, from the BLI (Boundary Layer Ingestion) type applications to the total electrical propulsion of large aircrafts. Thus, the need for power for an electrical propulsion of such an aircraft (mechanical power on the shaft of a fan), which is maximum on take-off and which represents about 25 MW for a single-aisle civil aircraft of the SMR (Short-Medium Range) type is however reduced by ⅓ during the climb in altitude then by ¼ in cruise phase.

This increase in the power of the electrical networks to ensure the propulsion needs will lead to the use of higher voltages than those of the current networks based essentially on the 115 VAC/400 Hz alternating current network and the 28 VDC direct current network, to reach several thousand volts (for example a DC network of about 1,500 V would be possible for an SMR-type aircraft) and brings new challenges specific to aeronautics, such as the variation of the dielectric strength of the air as a function of the altitude (the pressure decreases with the increase of the altitude).

The increase of the voltage level linked to the increase of the needs for power has indeed large impacts on the electrical networks and in particular on the protections, the reconfigurations of the network and on the issue of partial discharges.

Thus, the protections by high-voltage circuit breakers and the contactors allowing the reconfigurations of the network are generally bulky equipment and therefore particularly heavy because they require the use of an expansion chamber to extinguish the electric arc generated during the opening of the circuit. In addition, the standard circuit breakers are not dimensioned to operate above an altitude of about 1,500 m, which is of course insufficient with regard to the usual altitudes in aeronautics, including in pressurized areas. To overcome this drawback, it is possible to use semiconductor-based circuit breakers, on condition of using two dissimilar protection means to protect the networks, in accordance with the certification specifications required by the regulatory authorities.

As a result, the risk of occurrence of uncontrolled electric arcs or partial discharges is particularly increased. However, these electric arcs or localized partial discharges can involve the partial or complete destruction of the insulator of the electric cables, of the internal windings of the electrical machines and create failures or severe stresses at the electrical converters and the protection members.

OBJECT AND SUMMARY OF THE INVENTION

The object of the present invention is to propose a new architecture of an on-board power supply network of an aircraft with variable voltage allowing limiting the creation of electrical arcs and partial discharges while making sure that the needs for electrical power are taken into account in the different flight phases of the aircraft.

These aims are achieved thanks to a system for supplying electrical energy to at least one electrical load of an aircraft, this system comprising a main source of electrical energy connected to said at least one electrical load through an electrical network, the system being characterized in that it comprises a control device connected to said main source of electrical energy and configured to deliver a variable voltage level on said electrical network based on a predetermined voltage variation law depending on at least one parameter characterizing the altitude of the aircraft and according to the Paschen law with a predefined margin.

Thus, the invention proposes an electrical network architecture which adapts to its environment and in particular when, as for the electrical propulsion networks, the need for power decreases as a function of the altitude.

Advantageously, said predetermined voltage variation law also takes into account one or more of the following parameters characterizing: the need for power, the temperature, the state of the electrical network, the humidity, the pressure, the dust level, anticipated power or network state data.

According to the envisaged embodiment, said main source of electrical energy may be a Variable Frequency Generator (VFG) associated with a Generator Control Unit (GCU) and said control device is configured to act on said generator control unit in order to deliver on said electrical network a variable AC voltage level based on said predetermined voltage variation law, or said main source of electrical energy may be a Permanent Magnet Generator (PMG) associated with an active rectifier (AC/DC) and said control device is configured to act on said active rectifier in order to deliver on said electrical network a variable DC voltage level based on said predetermined voltage variation law.

The invention also relates to a method for supplying electrical energy to at least one electrical load of an aircraft, this method comprising the monitoring of at least one parameter characterizing the altitude of the aircraft, the determination by a control device connected to a main source of electrical energy of a variable voltage level to be delivered on an electrical network supplying said at least one electrical load based on a predetermined voltage variation law depending on said at least one monitored parameter, and the delivery from said main source of electrical energy and via said electrical network of said determined variable voltage level to said at least one electrical load, said voltage variation law according to the Paschen law with a predefined margin.

According to the envisaged embodiment, said variable voltage level is an AC voltage level or said variable voltage level is a DC voltage level.

The invention also relates to an aircraft including a system for supplying electrical energy to at least one electrical load as mentioned above.

BRIEF DESCRIPTION OF THE DRAWINGS

Other characteristics and advantages of the present invention will emerge better from the description below, given with reference to the appended drawings which illustrate an exemplary embodiment thereof without any limitation and on which.

DETAILED DESCRIPTION OF EXEMPLARY EMBODIMENTS

Figure 1:
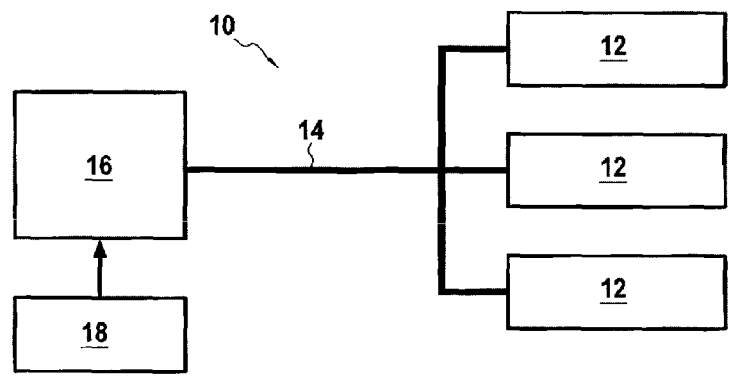
FIG. 1 shows a system for supplying electrical energy to at least one electrical load of an aircraft according to the invention.

FIG. 1 illustrates a system 10 for supplying electrical energy to at least one electrical load 12 of an aircraft through an electrical network 14 from a main source of electrical energy 16. The electrical load is typically a propulsion electrical load such as an electric motor actuating a fan. However, it can also be a non-propulsion load such as an APU for example.

According to the invention, the main source of electrical energy 16 is configured to deliver a voltage that is no longer constant, as known, but variable and optimized from the point of view of the dimensioning of the different electrical loads to be supplied, so as to use the electrical network 14 always at full capacity rather than the dimensioning for a predetermined fixed voltage. Thus, this main source will deliver a maximum voltage on take-off when the required power is maximum and this required power decreases during the climb of the aircraft and then again in cruise phase, it will then deliver a lower voltage according to this decrease. The voltage withstood by the dielectrics present on the electrical network decreasing with altitude, it should however be ensured that the breakdown voltage of these dielectrics defined by the Paschen law is met. It will be recalled that the Paschen law or curve which gives the breakdown voltage as a function of the distance/pressure product determines the limit, statically, between the possibility that an electric arc appears or not for a given pressure between two conductors separated in a determined distance.

To do so, it is provided that the variable voltage level delivered by the main source of electrical energy 16 is controlled by a control device 18 connected to this main source of electrical energy, as a function of at least one variable parameter necessary for determining the optimum voltage of the electrical network 14 of the aircraft.

Figure 2:
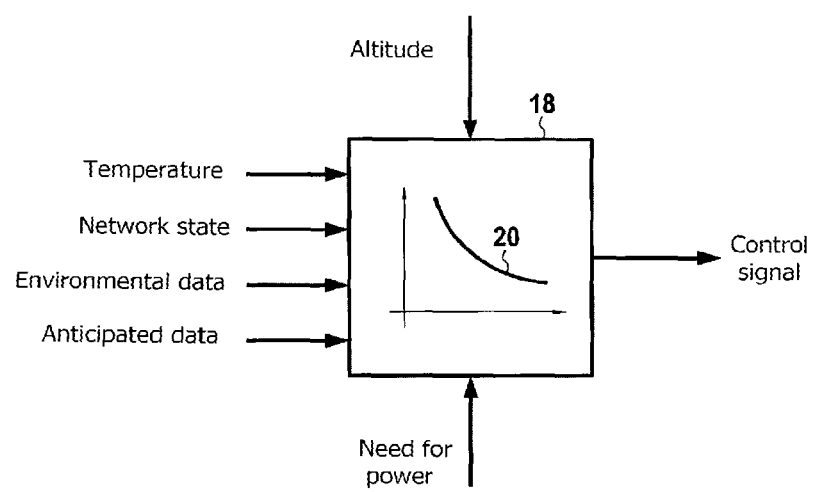
FIG. 2 illustrates different parameters allowing obtaining the control signal of the system of FIG. 1.

FIG. 2 shows different mandatory or optional parameters which are or can be used in the control device 18 to develop, based on a voltage variation law 20 predetermined and recorded in the device, a control signal allowing establishing at any moment the optimum voltage level desired on the electrical network. The altitude will be retained as a mandatory parameter and as other optional parameters, the power need (the consumed electrical power) of the electrical loads to be supplied, the temperature, the state of the electrical network or even other data allowing anticipating this consumed power or this state of the electrical network. More environmental data, such as pressure, humidity, dust level, etc. are also to be envisaged in order to be able to assess this optimum voltage level in real time.

Figure 3:
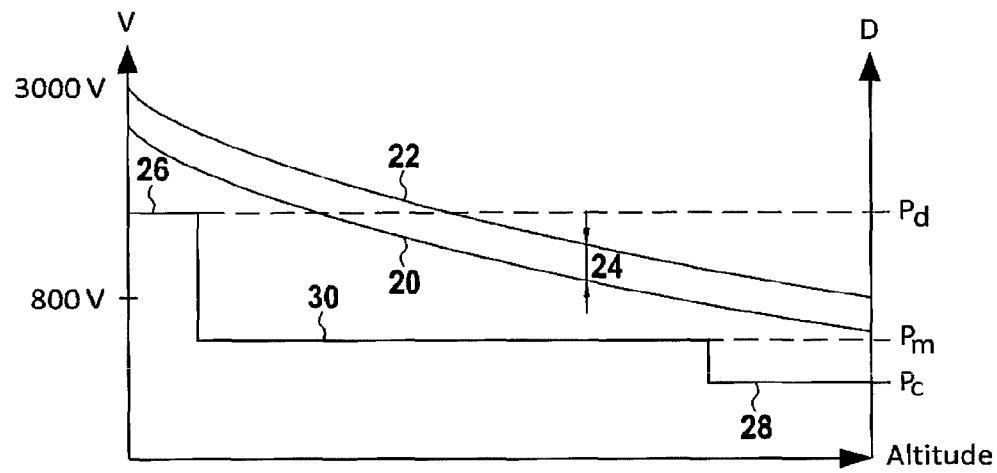
FIG. 3 is an example of the voltage variation law implemented for the control of the supply system of FIG. 1.

FIG. 3 illustrates an exemplary embodiment of the voltage variation law recorded in the control device. In this example, the voltage level of the electrical network 20 varies as a function of the only altitude of the aircraft according to the Paschen law (limitation curve) 22 with a predetermined margin 24 allowing meeting the limit of the breakdown voltage of the dielectrics present on the electrical network of the aircraft. It will be verified that this limitation as a function of the altitude is indeed compatible with the evolution of the power need of the aircraft, described previously, from takeoff 26 to cruise phase 28 including the altitude climb 30. For example, for a standard distance between 0.6 mm conductors, the Paschen law gives breakdown limits comprised between 3,000 V and 800 V for altitudes comprised between the ground and about 12 km and it will be noted that a 10% margin is then appropriate.

Figure 4:
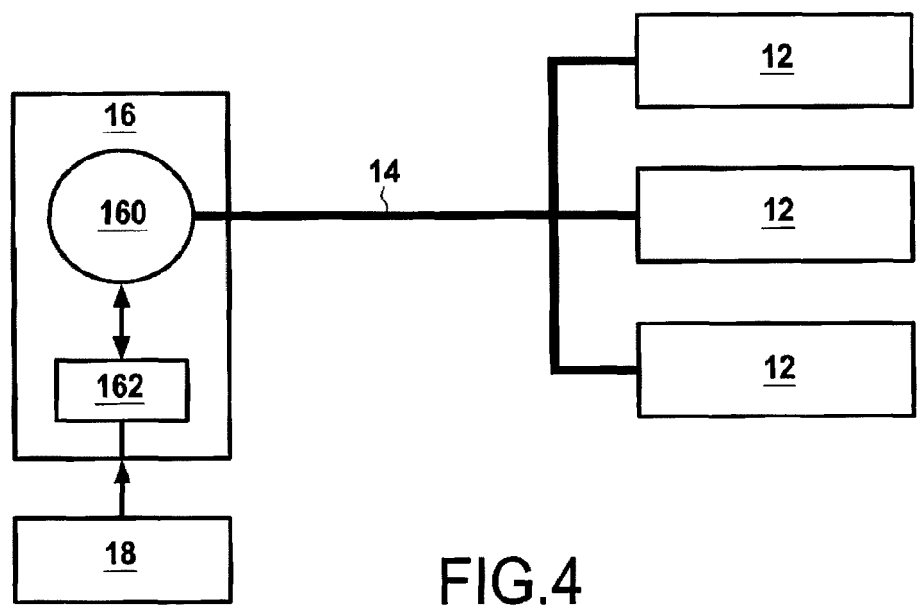
FIG. 4 shows an example of an AC electrical network of a system for supplying electrical energy to at least one electrical load of an aircraft according to the invention.
Figure 5:
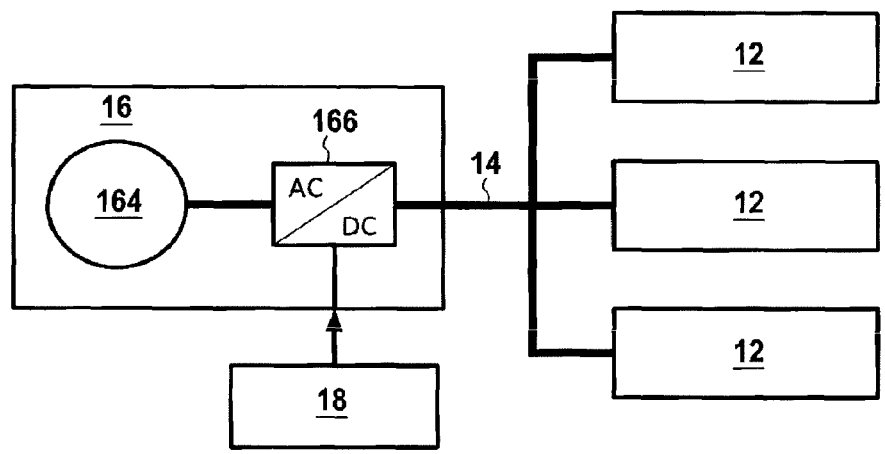
FIG. 5 shows an example of a DC electrical network of a system for supplying electrical energy to at least one electrical load of an aircraft according to the invention.

FIGS. 4 and 5 represent two examples of electrical networks on-board an aircraft implementing the invention. Of course, other electrical network configurations using, for example, a battery+DC/DC converter assembly, or a battery+DC/AC converter assembly, or a fuel cell+converter assembly can also be envisaged.

In FIG. 4, the electrical network 14 is a fully alternating (AC) network from the source to the load and the main source of electrical energy 16 is a Variable Frequency Generator 160 (VFG) associated with a Generator Control Unit 162 (GCU). In FIG. 5, the electrical network 14 is a fully direct (DC) network from the source to the load and the main source of electrical energy 16 is a Permanent Magnet Generator 164 (PMG) associated with an active rectifier 166 (AC/DC converter). In these two examples, the control device 18 delivers to the generator control unit 162 or to the active rectifier 166 the control signal which, based on the predefined voltage variation law 20 it incorporates, will allow establishing the optimum voltage level on the electrical network 14 supplying the electrical loads 12.

Figure 6:
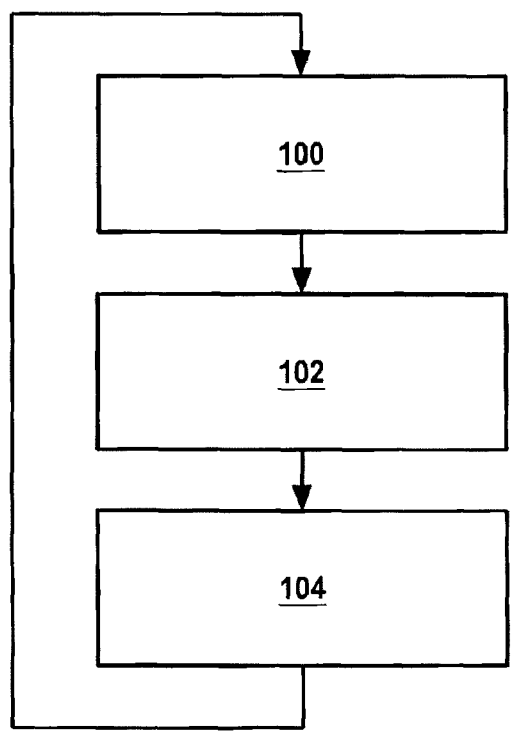
FIG. 6 illustrates the different steps of the electrical energy supply method implemented in the system of FIG. 1.

FIG. 6 illustrates in a simplified manner an example of the method implemented in the control device 18. First, as a first step 100, the parameters included in the determination of the desired optimum voltage level are monitored. At a minimum, this involves the monitoring of the altitude of the aircraft, but it can also concern its need for power or the state of the electrical network as explained above. The different values of these parameters are given by different sensors known per se and available on the aircraft. In a following step 102, the control device applying the voltage variation law 20 at its disposal will determine the optimum voltage level corresponding to the value of the parameter(s) obtained. When only the altitude is recorded, the voltage variation law used refers to the Paschen law, following its evolution within a safety margin. When other parameters are taken into account, it is another predetermined voltage variation law that is used without however exceeding, for any altitude, the voltage limit set by the previous voltage variation law. Finally, in a terminal step 104, the voltage of the electrical network 14 is regulated around this optimum voltage level through the generator control unit 162 or the active rectifier 166 of the main source of electrical energy 16 depending on the type of AC or DC network implemented.

The variability of the voltage level delivered by the main source of electrical energy under the action of the control device provides several advantages without major modification to the equipment present on the network. In particular, it can be used to ensure the redundancy necessary for the overcurrent protections. If the protection fails, it is then possible to cancel the current in the circuit by canceling the voltage on the electrical network to allow opening a redundant contactor (whose breaking capacity may be zero). Likewise, when the number of propulsion loads present on the network is limited, this variability of the voltage level can be used to carry out reconfigurations of the electrical network at a low voltage level or even at zero voltage and current level.

The invention claimed is:

1. A system for supplying electrical energy to at least one propulsion and/or non-propulsion electrical load of an aircraft, said system comprising a main source of electrical energy connected to said at least one electrical load through an electrical network the system comprising a control device connected to said main source of electrical energy and configured to deliver a variable voltage level on said electrical network based on a predetermined voltage variation law depending on at least one parameter characterizing the altitude of the aircraft and according to the Paschen law with a predefined margin.

2. The system according to claim 1, wherein said main source of electrical energy is a Variable Frequency Generator associated with a Generator Control Unit and said control device is configured to act on said generator control unit in order to deliver on said electrical network a variable AC voltage level based on said predetermined voltage variation law.

3. The system according to claim 1, wherein said main source of electrical energy is a Permanent Magnet Generator associated with an active rectifier and said control device is configured to act on said active rectifier in order to deliver on said electrical network a variable DC voltage level based on said predetermined voltage variation law.

4. An aircraft including a system for supplying electrical energy to at least one electrical load according to claim 1.

5. A method for supplying electrical energy to at least one electrical load of an aircraft, said method comprising the monitoring of at least one parameter characterizing the altitude of the aircraft, the determination by a control device connected to a main source of electrical energy of a variable voltage level to be delivered on an electrical network supplying said at least one electrical load based on a predetermined voltage variation law depending on said at least one monitored parameter, and the delivery from said main source of electrical energy and via said electrical network of said determined variable voltage level to said at least one electrical load, said voltage variation law according to the Paschen law with a predefined margin.

6. The method according to claim 5, wherein said variable voltage level is an AC voltage level.

7. The method according to claim 5, wherein said variable voltage level is a DC voltage level.

8. The method according to claim 5, wherein said predetermined voltage variation law also takes into account one or more of the following parameters characterizing: a need for power, a temperature, a state of the electrical network, humidity, pressure, dust level, anticipated power or network state data.

* * * * *